2,721,218

METHOD OF PREPARING TRIAMINOGUANIDINE HYDROCHLORIDE

Donald W. Kaiser, Old Greenwich, and Grace A. Peters, Stamford, Conn., assignors to American Cyanamid Company, New York, N. Y., a corporation of Maine No Drawing. Application November 9, 1953, Serial No. 391,131

2 Claims. (Cl. 260—564)

The present invention relates to the preparation of triaminoguanidine hydrochloride.

Heretofore, triaminoguanidine hydrochloride has been prepared by the action of hydrazine on carbon tetrachloride at its boiling point, and by the reaction of hydrazine with dichloroformoxime in a cold ethereal solution. These methods not only give low yields of triaminoguanidine hydrochloride, but considerable difficulty is encountered in separating the product from accompanying by-products.

Accordingly, it is the principal object of the present invention to devise an economical method by which triaminoguanidine hydrochloride may be obtained in good yields and high purity.

Surprisingly, this object has been accomplished in a simple and effective manner by causing one molar equivalent of cyanogen chloride to react with 3 molar equivalents of hydrazine in aqueous solution maintained at a temperature not greater than about 30° C.

In the practice of the present invention, it is essential that the reactants be brought together in the proportion of one molar equivalent of cyanogen chloride to 3 molar equivalents of hydrazine. The reaction may be illustrated as follows:

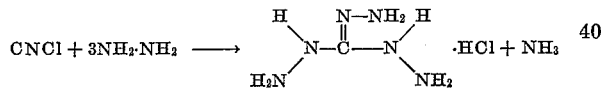

The cyanogen chloride is vaporized slowly into an aqueous solution of hydrazine maintained at a temperature within the range of from about 0° C. to about 30° C., and preferably between 10° C. and 25° C. The solution is then evaporated to recover the crude triaminoguanidine hydrochloride which may be purified by recrystallization from water.

The invention is further illustrated, but not limited, by the following example:

Twenty milliliters (0.4 mole) of liquid cyanogen chloride was allowed to distill into a stirred solution of 60 g. (1.2 moles) of hydrazine hydrate ($NH_2 \cdot NH_2 \cdot H_2O$) in 100 g. of water maintained at about 20° C. for a period of three hours. The solution was evaporated to dryness on a steam bath, leaving 48 g. of crude triaminoguanidine hydrochloride. Recrystallization from water gave 37.5 g. (78.2% yield) of the white crystalline product having a melting point of 234°–236° C.

The present invention provides a simple, economical method of preparing triaminoguanidine hydrochloride in good yields. The product is easily recovered from the aqueous solution and purified in a simple manner.

While the invention has been described with particular reference to specific embodiments, it is to be understood that it is not to be limited thereto, but is to be construed broadly and restricted solely by the scope of the appended claims.

We claim:

1. A method of preparing triaminoguanidine hydrochloride which comprises bringing together one molar equivalent of cyanogen chloride and 3 molar equivalents of hydrazine in aqueous solution maintained at a temperature not greater than 30° C., and subsequently recovering triaminoguanidine hydrochloride from said solution.

2. The method of claim 1 in which the temperature is within the range of 10° to 25° C.

References Cited in the file of this patent

Pellizzari et al.: Gazz, chimica Ital. 44 (II), 78 (1914).
Pellizzari et al.: Gazz. chimica Ital. 35 (I), 291 (1911).
Migrdichian: The Chem. of Org. Cyanogen Compounds, page 104, A. C. S., Monograph Series, Reinhold Pub. Co.